(12) United States Patent
Woo et al.

(10) Patent No.: US 12,103,590 B2
(45) Date of Patent: Oct. 1, 2024

(54) FASTENING APPARATUS FOR VEHICLE

(71) Applicant: HYUNDAI MOBIS CO., LTD., Seoul (KR)

(72) Inventors: Hyun Jin Woo, Yongin-si (KR); Hyoun Young Oh, Yongin-si (KR); Ho Youn Hwang, Yongin-si (KR); Jae Woong Jeon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 317 days.

(21) Appl. No.: 17/861,602

(22) Filed: Jul. 11, 2022

(65) Prior Publication Data

US 2023/0056169 A1  Feb. 23, 2023

(30) Foreign Application Priority Data

Aug. 23, 2021  (KR) .......................... 10-2021-0110898

(51) Int. Cl.
  *B62D 24/02*  (2006.01)
  *B60K 1/04*  (2019.01)
(52) U.S. Cl.
  CPC .............. *B62D 24/02* (2013.01); *B60K 1/04* (2013.01); *B60K 2001/0438* (2013.01)
(58) Field of Classification Search
  CPC ... B62D 24/02; B60K 1/04; B60K 2001/0438
  See application file for complete search history.

(56) References Cited

U.S. PATENT DOCUMENTS

| | | | | |
|---|---|---|---|---|
| 6,062,763 A * | 5/2000 | Sirois | .................... | B62D 27/04 403/329 |
| 6,820,908 B1 * | 11/2004 | Tousi | .................... | B62D 21/11 248/609 |
| 2001/0052713 A1 * | 12/2001 | Kim | ........................ | B62D 24/02 296/35.1 |
| 2005/0073166 A1 * | 4/2005 | Snyder | .................. | B62D 24/02 296/35.1 |
| 2005/0248185 A1 * | 11/2005 | Hayashi | ................. | B62D 24/02 296/193.07 |
| 2006/0202515 A1 * | 9/2006 | Dickson | ............... | B60G 99/002 296/190.07 |
| 2013/0168989 A1 * | 7/2013 | Sasage | ................... | B62D 24/02 296/35.1 |
| 2014/0239659 A1 * | 8/2014 | Rodecker | .............. | F16F 1/3713 296/35.1 |
| 2015/0298745 A1 * | 10/2015 | McMullen | ............. | B62D 24/02 248/635 |

(Continued)

FOREIGN PATENT DOCUMENTS

KR  10-2021-0077367 A  6/2021

*Primary Examiner* — Erez Gurari
(74) *Attorney, Agent, or Firm* — NSIP Law

(57) ABSTRACT

A fastening apparatus for a vehicle including a first fastening unit fixed to a first structure, a second fastening unit fixed to a second structure, the second fastening unit being inserted into the first fastening unit, a holding unit movably installed on the first fastening unit and being configured to restrict and allow relative movement of each of the first fastening unit and the second fastening unit according to a direction of movement of the holding unit, and a moving unit installed outside the first fastening unit, the moving unit being configured to ascend and descend by a magnetic force, and to adjust the direction of the movement of the holding unit.

15 Claims, 13 Drawing Sheets

(56) References Cited

U.S. PATENT DOCUMENTS

| | | | |
|---|---|---|---|
| 2018/0180135 A1* | 6/2018 | Nydam | B62D 24/02 |
| 2019/0039654 A1* | 2/2019 | Rawlings | F16F 13/101 |
| 2019/0344831 A1* | 11/2019 | Asai | F16F 3/0873 |
| 2021/0179203 A1* | 6/2021 | Olsson | B62D 33/0604 |
| 2022/0063732 A1* | 3/2022 | Gaspar | B62D 27/04 |
| 2023/0056169 A1* | 2/2023 | Woo | B62D 65/024 |
| 2023/0339544 A1* | 10/2023 | Abe | F16F 15/08 |

* cited by examiner

FASTENING APPARATUS FOR VEHICLE

CROSS-REFERENCE TO RELATED APPLICATION

This application claims the benefit under 35 USC § 119(a) of Korean Patent Application No. 10-2021-0110898, filed on Aug. 23, 2021, the entire disclosure of which is incorporated herein by reference for all purposes.

BACKGROUND

1. Field

Exemplary embodiments of the present disclosure relate to a fastening apparatus for a vehicle and, more particularly, to a fastening apparatus for a vehicle, the apparatus being capable of easily mounting or separating a top hat or a battery module on and from a chassis frame of a purpose-built vehicle (PBV).

2. Description of Related Art

Generally, purpose-built vehicles (PBVs) mean future-oriented vehicles in which, with the development of autonomous traveling technology, an in-vehicle space is freely utilized suitably for an application to provide a customized service necessary to a user during a traveling time to a destination.

These PBVs have a structure where a top hat designed suitably for the user's intended purpose, that is, an upper portion of a vehicle frame, is combined with a skateboard-shaped chassis frame underneath which a battery module is widely arranged. Accordingly, there is a need for development of a novel fastening structure where the top hat or the battery module can be easily separated, for replacement, from the vehicle chassis frame and where assembly automation can be realized.

An example of the related art is disclosed in Korean Patent Application Publication No. 10-2021-0077367 published on Jun. 25, 2021, titled "Vehicle Body Assembly Structure".

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a fastening apparatus for a vehicle, including a first fastening unit fixed to a first structure, a second fastening unit fixed to a second structure, the second fastening unit being inserted into the first fastening unit, a holding unit movably installed on the first fastening unit and being configured to restrict and allow relative movement of each of the first fastening unit and the second fastening unit according to a direction of movement of the holding unit, and a moving unit installed outside the first fastening unit, the moving unit being configured to ascend and descend by a magnetic force, and to adjust the direction of the movement of the holding unit.

The first fastening unit may include an extension portion extending toward the second fastening unit, and an accommodation portion formed in the extension portion to pass therethrough, and being configured to movably support the holding unit in a radial direction of the extension portion.

A width of the accommodation portion may decrease toward an inside of the extension portion.

A plurality of the accommodation portions are provided and may be arranged to be spaced a distance apart along a circumference of the extension portion.

The second fastening unit may include an insertion portion inserted into the first fastening unit, and a hook formed by concavely recessing an external surface of the insertion portion and being fastened to the holding unit.

The insertion portion may be fully inserted into the first fastening unit to connect the hook with the accommodation portion.

The second fastening unit may include a rotation prevention portion protruding from the insertion portion to prevent relative rotation of the first fastening unit and the second fastening unit.

An elastically-transformable first pad may be installed on an inner circumferential surface of the extension portion, and the rotation prevention portion may be configured to press against the first pad to be in close contact with the first pad.

The holding unit may be spherical in shape and may be installed inside the accommodation portion.

The moving unit may include a moving body arranged to face the first fastening unit and being configured to ascend and descend along a lengthwise direction of the first fastening unit, a drive unit generating a magnetic field to move the moving body to one side, and a guide unit provided between the moving body and the first fastening unit and being configured to guide movement of the holding unit in conjunction with upward and downward movements of the moving body.

The drive unit may include an electromagnet fixed to the second fastening unit and being configured to generate a magnetic field by application of electric current thereto, and a permanent magnet fixed to the moving body and arranged to face the electromagnet.

The guide unit may include a first guide groove formed by concavely recessing an internal surface of the moving body and being configured to keep the holding unit positioned at a first position, a second guide groove protruding from the internal surface of the moving body and being configured to keep the holding unit positioned at a second position, and a third guide groove provided between the first guide groove and the second guide groove and being configured to guide the holding unit in being moved from the first position to the second position.

The third guide groove may be rounded with a predetermined curvature.

The moving unit may include a restoration unit configured to move the moving body to the other side, in response to the magnetic field no longer occurring from the drive unit.

The restoration unit may include an elastic member installed between the moving body and the first fastening unit to be expandable and contractable along a lengthwise direction thereof, and a pair of support portions fixed to the moving body and the first fastening unit, respectively, and being configured to supporting both sides, respectively, of the elastic member.

Other features and aspects will be apparent from the following detailed description, the drawings, and the claims.

Figure 1:
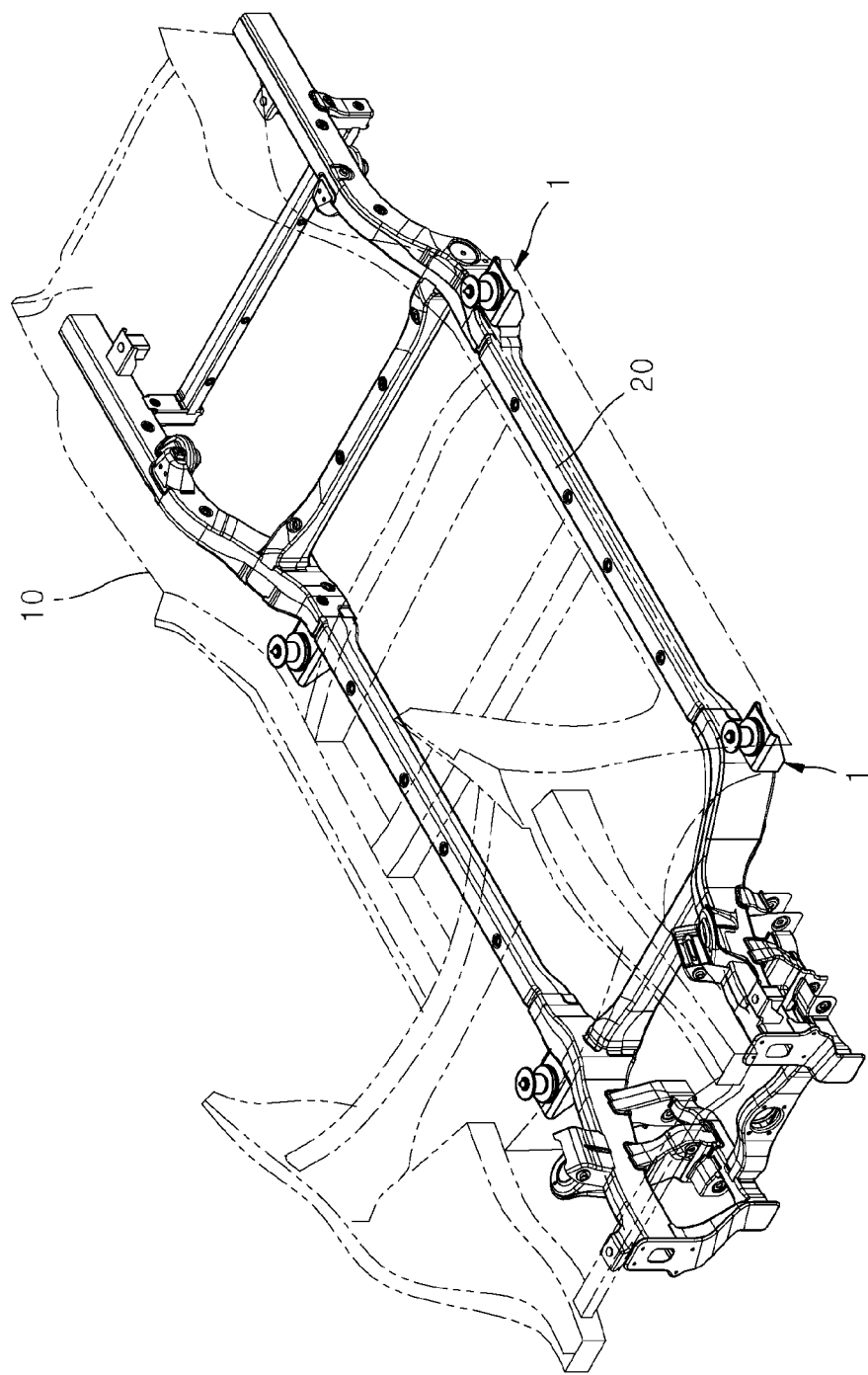
FIG. 1 is a view schematically illustrating a state where a fastening apparatus for a vehicle according to an embodiment of the present disclosure is installed.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

A fastening apparatus for a vehicle according to an embodiment of the present disclosure will be described below with reference to the accompanying drawings.

For clarity and convenience in description, the thicknesses of lines and the sizes of constituent elements may be exaggeratedly illustrated in the drawings. In addition, a term defined by considering a function of a constituent element according to the present disclosure to which the term is assigned will be used below and may vary according to the user's or manager's intention or to practices in the art. Therefore, the term should be defined in context in light of the present specification.

In addition, a constituent element, when referred to as "being connected to (or making contact with)" one other constituent element, may "be directly connected to (or make direct contact with)" one other constituent element or may "be indirectly connected to (or make indirect contact with)" one other constituent element with an intervening constituent element in between." Unless otherwise particularly described, the expression like "an apparatus includes (has) a constituent element," when used throughout the specification, means that an apparatus may "further include (or have)" any other constituent element, not meaning that an apparatus excludes any other constituent element."

The same reference numeral throughout the present specification may refer to the same constituent element. The same reference numerals or similar reference numerals, although not shown in a specific drawing, may be used for description with reference to another drawing. In addition, a constituent element, although not given a reference numeral in a specific drawing, may be described with reference to another drawing. In addition, the number of, shapes of, and sizes of, constituent elements illustrated in the drawing of the present application and a relative difference between the sizes are defined to provide a convenient basis for understanding the present disclosure, without imposing any limitation on embodiments, and may be defined in various ways.

Figure 2:
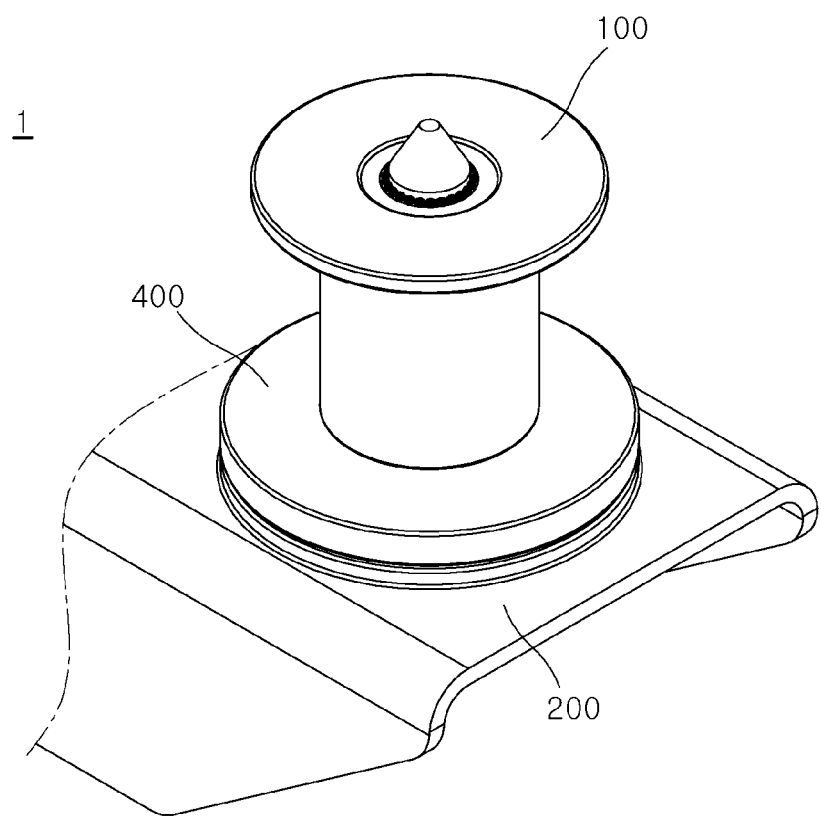
FIG. 2 is a perspective view schematically illustrating a configuration of the fastening apparatus for a vehicle according to the embodiment of the present disclosure.
Figure 3:
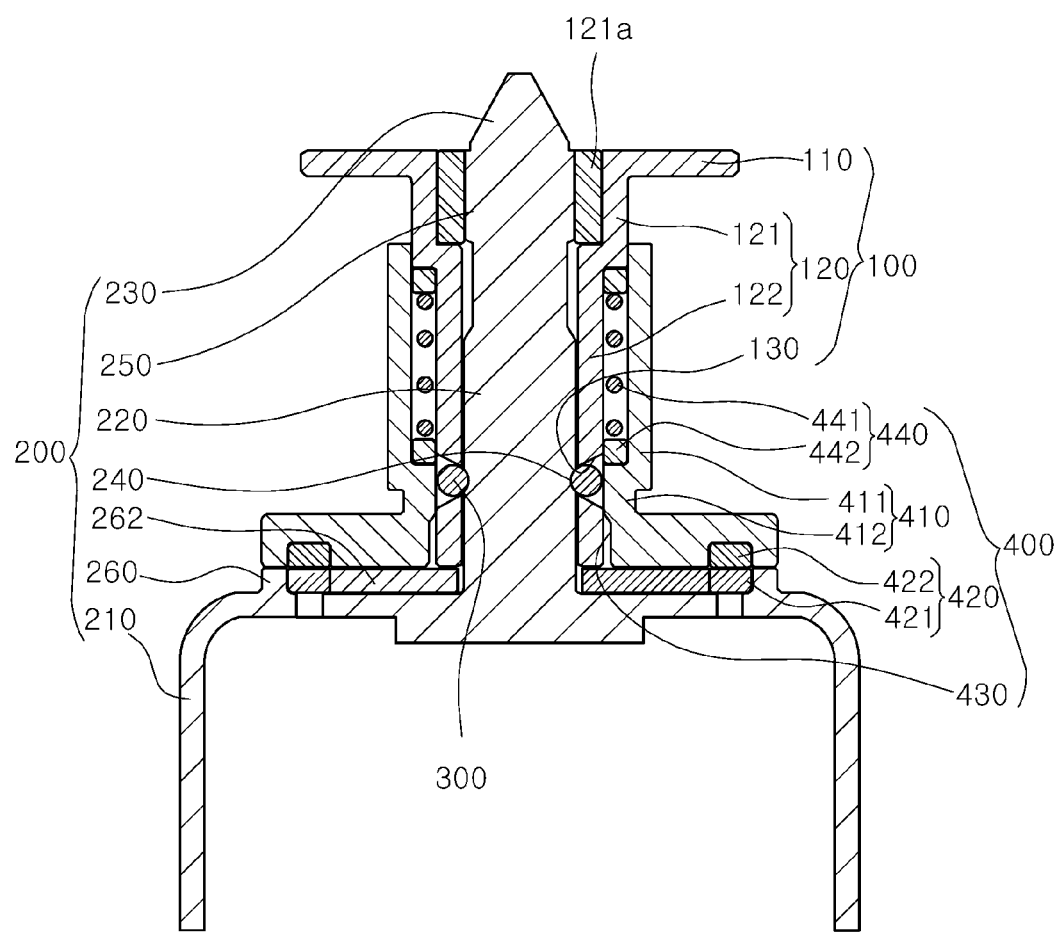
FIG. 3 is a cross-sectional view schematically illustrating the configuration of the fastening apparatus for a vehicle according to the embodiment of the present disclosure.
Figure 4:
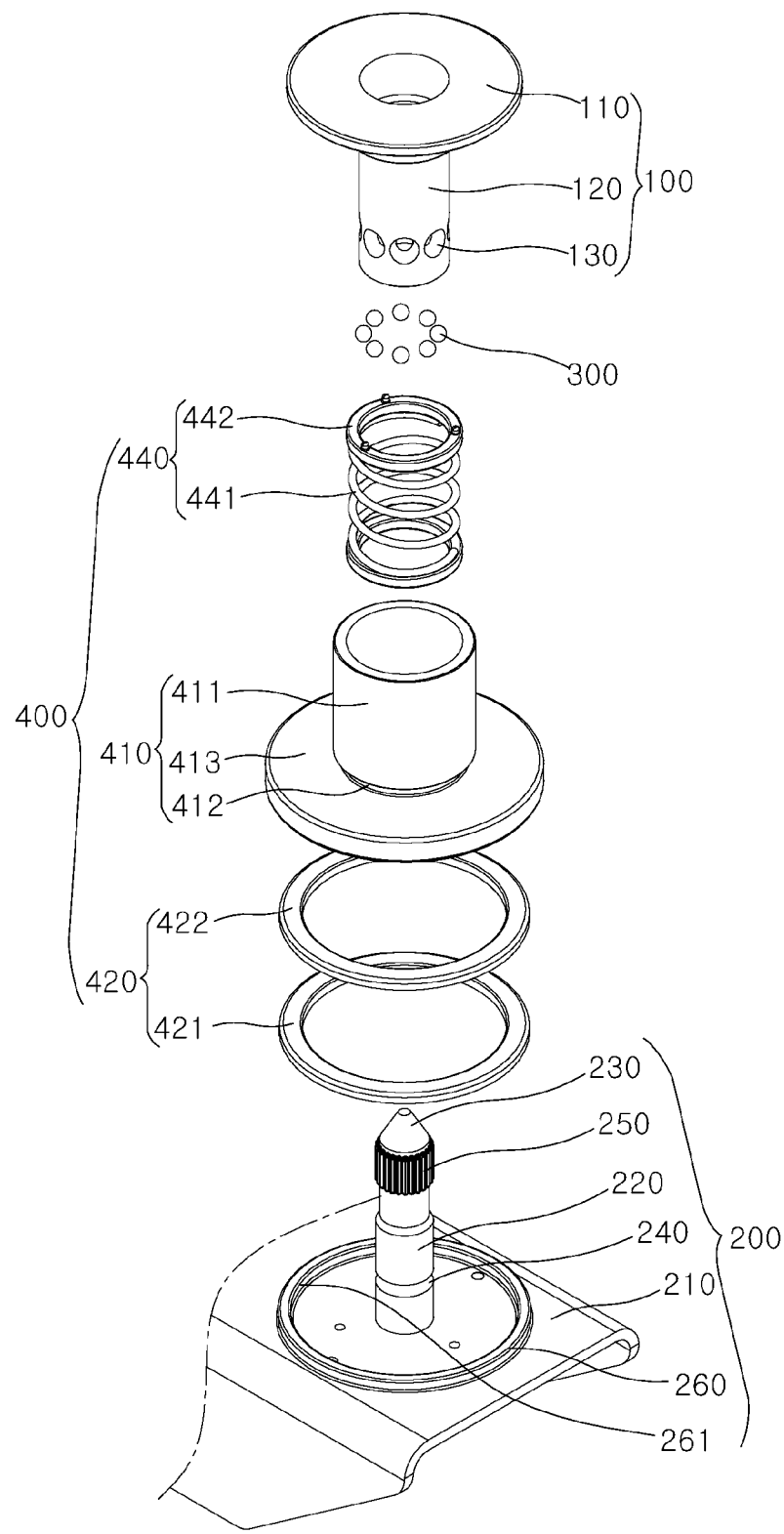
FIG. 4 is an exploded perspective view schematically illustrating the configuration of the fastening apparatus for a vehicle according to the embodiment of the present disclosure.

FIG. 1 is a view schematically illustrating a state where a fastening apparatus for a vehicle according to an embodiment of the present disclosure is installed. FIG. 2 is a perspective view schematically illustrating a configuration of the fastening apparatus for a vehicle according to the embodiment of the present disclosure. FIG. 3 is a cross-sectional view schematically illustrating the configuration of the fastening apparatus for a vehicle according to the embodiment of the present disclosure. FIG. 4 is an exploded perspective view schematically illustrating the configuration of the fastening apparatus for a vehicle according to the embodiment of the present disclosure.

With reference to FIGS. 1 to 4, a fastening apparatus 1 for a vehicle according to the embodiment of the present disclosure includes a first fastening unit 100, a second fastening unit 200, a holding unit 300, and a moving unit 400.

A first structure 10 and a second structure 20 that will be described below may be exemplified by a top hat and a chassis frame, respectively. The top hat corresponds to a vehicle frame. The chassis frame is installed under a vehicle body and structurally supports the vehicle body. The top hat and the chassis frame can be customized and replaced according to a user's purpose. However, the first structure 10 and the second structure 20 are not limited thereto. It is possible that the first structure 10 and the second structure 20 are variously design-changed to different structures, respectively, for example, a chassis frame and a battery module, that can be fastened to, and separated from each other in the vehicle.

The first fastening unit 100 is fixed to the first structure 10 and is combined with the second fastening unit 200 with the holding unit 300 in between. Thus, the first fastening unit 100 fixes the second structure 20 and the first structure 10 to each other.

Figure 5A:
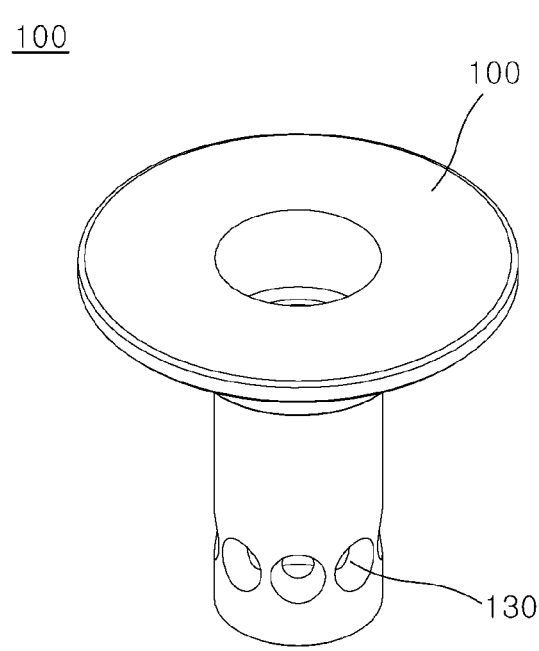
FIGS. 5A and 5B are a perspective view schematically illustrating a configuration of a first fastening unit according to the embodiment of the present disclosure.
Figure 5B:
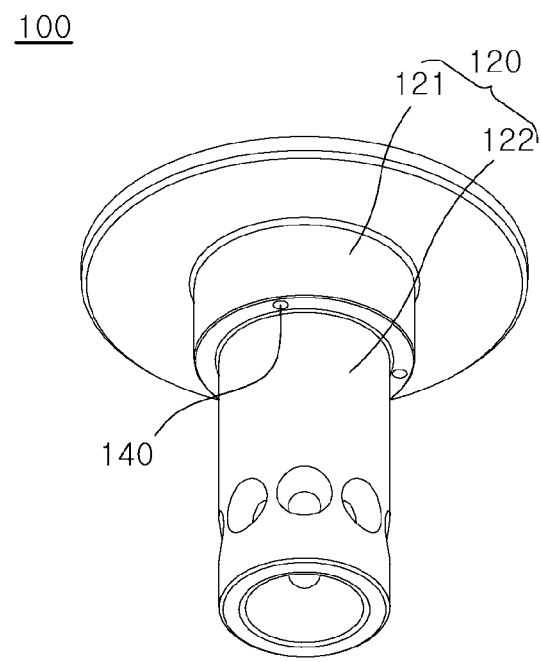

FIG. 5 is a perspective view schematically illustrating a configuration of the first fastening unit 100 according to the embodiment of the present disclosure.

With reference to FIGS. 1 to 5, the first fastening unit 100 according to the embodiment of the present disclosure includes a flange 110, an extension portion 120, an accommodation portion 130, and a first extending groove 140.

The flange 110 forms an exterior appearance of an upper portion of the first fastening unit 100 according to the embodiment of the present disclosure and supports both the extension portion 120 and the accommodation portion 130 that will be described below. The flange 110 according to the embodiment of the present disclosure may be formed in the shape of a hollow circular plate in such a manner as to have a through-hole in the center portion thereof. The flange 110 is seated on an internal surface or external surface of the first structure 10 for being fixed thereto. The flange 110 may be welded or bonded to the internal surface or external surface of the first structure 10 and thus may be integrally combined with the first structure 10. It is possible that the flange 110 is specifically design-changed to various shapes in addition to a circular shape illustrated in FIG. 5 in such a manner as to be fixed to the first structure 10.

The extension portion 120 extends from the flange 110 toward the second fastening unit 200 described below and forms an exterior appearance of a center portion of the first fastening unit 100 according to the embodiment of the present disclosure. The extension portion 120 according to the embodiment of the present disclosure may include a first extension portion 121 and a second extension portion 122.

The first extension portion 121 may be formed in the form of a bar in such a manner as to vertically extend downward from an internal surface of the flange 110. The first extension portion 121 is formed in such a manner as to have an empty space inside, and an upper surface thereof connects with a through-hole formed in a center portion of the flange 110.

A first pad 121a may be installed in an inner circumferential surface of the first extension portion 121. The first pad 121a according to the embodiment of the present disclosure is formed in such a manner as to have the shape of a hollow cylinder and is arranged in such a manner that an outer circumferential surface thereof faces the inner circumferential surface of the first extension portion 121. An outer circumferential surface of the first pad 121a may be fixed to the inner circumferential surface of the first extension portion 121 with an adhesive or the like. The first pad 121a may be formed of an elastically transformable material, such as rubber or silicone.

The second extension portion 122 vertically extends downward from a lower end portion of the first extension portion 121. The second extension portion 122 is formed in such a manner as to have an empty space inside and connects with the first extension portion 121. The second extension portion 122 may be formed in a manner that has a smaller diameter than the first extension portion 121. Accordingly, the second extension portion 122 has a stepped portion thereof in contact with the first extension portion 121 and thus provides a space where the first extending groove 140 may be installed.

The accommodation portion 130 is formed in the extension portion 120 in a manner that passes therethrough and supports the holding unit 300 described below in a manner that is movable in a radial direction of the extension portion 120. The accommodation portion 130 according to the embodiment of the present disclosure may be formed in the shape of a hole in such a manner as to horizontally pass through an outer circumferential surface of the second extension portion 122. A plurality of the accommodation portions 130 are provided and are arranged to be spaced a predetermined distance apart along the extension portion 120, more particularly, along a circumference of the second extension portion 122.

The accommodation portion 130 may be provided in such a manner that a width thereof decreases toward the inside of the extension portion 120. That is, the accommodation portion 130 extends from the outer circumferential surface of the second extension portion 122 in a manner that is inclined by a predetermined angle toward an inner circumferential surface of the second extension portion 122. Accordingly, the accommodation portion 130 may guide the holding unit 300 in moving from a second position to a first position on the extension portion 120 by its own weight without an external force. The accommodation portion 130 is formed in such a manner that one end portion thereof that pass through the inner circumferential surface of the second extension portion 122 has a smaller diameter than the holding unit 300. In addition, the accommodation portion 130 is formed in such a manner that the other end portion thereof that passes through the outer circumferential surface of the second extension portion 122 has a greater diameter than the holding unit 300.

The first extending groove 140 is formed in the extension portion 120 in a manner that passes therethrough. The first extending groove 140 according to the embodiment of the present disclosure may be formed in the shape of a hole in such a manner as to vertically pass through a lower surface of the first extension portion 121. A plurality of the first extending grooves 140 may be provided and may be arranged to be spaced a predetermined distance apart along a circumferential direction of the first extension portion 121.

The second fastening unit 200 is fixed to the second structure 20 and is inserted into the first fastening unit 100. The second fastening unit 200 is combined with the first fastening unit 100 with the holding unit 300 described below in between and thus fixes the second structure 20 and the first structure 10 with respect to each other.

Figure 6:
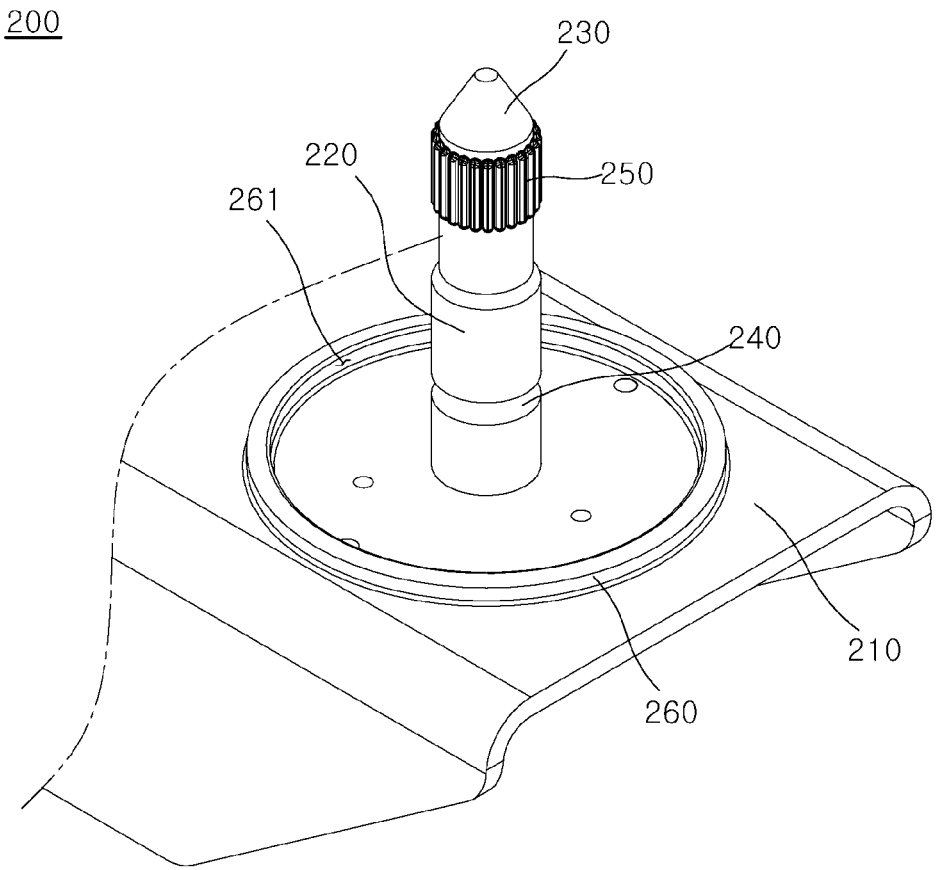
FIG. 6 is a perspective view schematically illustrating a configuration of a second fastening unit according to the embodiment of the present disclosure.

FIG. 6 is a perspective view schematically illustrating a configuration of the second fastening unit 200 according to the embodiment of the present disclosure.

With reference to FIGS. 1 to 6, the second fastening unit 200 according to the embodiment of the present disclosure includes a bracket 210, an insertion portion 220, an entry guidance portion 230, a hook 240, a rotation prevention portion 250, and a seating portion 260.

The bracket 210 is fixed to the second structure 20 and supports the insertion portion 220 and the seating portion 260 that will be described below. The bracket 210 may be integrally fixed to the second structure 20 by welding or the like. Otherwise, it is also possible that the bracket 210 is removably fixed to the second structure 20 by bolting or the like. A specific shape of the bracket 210 is not limited to a shape illustrated in FIG. 6. It is possible that a shape of the bracket is design-changed within a range of the technical idea that the bracket 210 is variously shaped in a manner that is fixable to the second structure 20.

The insertion portion 220 extends toward the first fastening unit 100 from the bracket 210 and is inserted into the first fastening unit 100. The insertion portion 220 according to the embodiment of the present disclosure may be formed in the shape of a bar in such a manner as to vertically extend upward from an upper surface of the bracket 210. The first structure 10 is seated on the top of the second structure 20, and thus the insertion portion 220 is inserted into the extension portion 120. In order to be smoothly inserted into the extension portion 120, the insertion portion 220 may be formed in such a manner as to have a diameter corresponding to a diameter of an inner circumference of the second extension portion 122.

The entry guidance portion 230 extends from the insertion portion 220 and guides the insertion portion 220 in entering the first fastening unit 100. The entry guidance portion 230 according to the embodiment of the present disclosure vertically extends upward from an upper end portion of the insertion portion 220. The entry guidance portion 230 is provided in such a manner that the width thereof decreases toward the end thereof. Accordingly, the entry guidance portion 230 may be formed in such a manner as to have a substantially conical shape.

The hook 240 is formed in the shape of a groove by concavely recessing an external surface of the insertion portion 220. The hook 240 extends along a circumferential direction of the insertion portion 220 in such a manner as to form a closed curve. The insertion portion 220 is fully inserted into the extension 120, and thus the hook 240 connects with an internal end portion of the accommodation portion 130. In this case, the full insertion of the insertion portion 220 into the extension portion 120 may be exemplified by a state where a lower end portion of the second extension portion 122 is in contact with an upper surface of the second pad 262 described below. The holding unit 300 moves to one side inside the accommodation portion 130, and thus an inner circumferential surface of the holding unit 300 is inserted into the hook 240. Consequently, the hook 140 is fastened to the holding unit 300.

The rotation prevention portion 250 protrudes from the external surface of the insertion portion 220 and prevents relative rotation of the second fastening unit 200 with respect to the first fastening unit 100. The rotation prevention portion 250 according to the embodiment of the present disclosure may be formed in the shape of saw teeth in such a manner as to protrude along an outer circumferential surface of the upper end portion of the insertion portion 220. The insertion portion 220 is fully inserted into the extension portion 120, and thus the rotation prevention portion 250 is arranged to face an inner circumferential surface of the first pad 121a. The rotation prevention portion 250 in the shape of teeth presses against an internal surface of the first pad 121a and thus elastically transforms the first pad 121a. Consequently, the rotation prevention portion 500 is brought into close contact with the internal surface of the first pad 121a for being fixed thereto.

The seating portion 260 extends from the bracket 210 and has a space inside. An electromagnet 421 described below is installed in the space. The seating portion 260 according to the embodiment of the present disclosure vertically protrudes from the upper surface of the bracket 210. The seating portion 260 extends along a circumference of which the central axis is the insertion portion 220. Accordingly, the seating portion 260 may be formed in such a manner as to have a substantially ring-shaped cross section.

A wire groove 261 may be formed in an inner circumferential surface of the seating portion 260. A wire along which electric current is supplied to the electromagnet 421 is installed inside the wire groove 261. The wire groove 261 according to the embodiment of the present may be formed in the shape of a groove by concavely recessing the inner circumferential surface of the seating portion 260 toward an outer circumferential surface of the seating portion 260. The wire groove 261 extends along a circumferential direction of the seating portion 260 in such a manner as to form a closed curve. It is possible that a curvature and depth of the wire groove 261 are variously design-changed according to the sizes of wires connected to the electromagnet 421, the number of the wires, and the like.

The second pad 262 may be installed in a space inside the seating portion 260. The second pad 262 elastically supports the first fastening unit 100 and the electromagnet 421. The second pad 262 according to the embodiment of the present disclosure is formed in such a manner as to have the shape of a substantially circular plate and is installed inside the seating portion 260. A lower surface of the second pad 262 is brought into contact with the upper surface of the bracket 210, and thus the second pad 262 is supported on the upper surface thereof. A plurality of protrusions protruding from the lower surface of the second pad 262 may be forced to fit into the upper surface of the bracket 210 for being combined therewith, and thus the second pad 262 may be fixed to the upper surface thereof. It is also possible that the second pad 262 is fixed to the upper surface of the bracket 210 with an adhesive or the like. The second pad 262 is formed in such a manner as to have a diameter smaller than a diameter of an inner circumference of the seating portion 260. Accordingly, the second pad 262 may have a space between an outer circumferential surface thereof and the inner circumferential surface of the seating portion 260. The electromagnet 421 may be installed in the space. The second pad 262 is formed of an elastically transformable material, such as rubber or silicone. The insertion portion 220 is fully inserted into the extension portion 120, and thus the second pad 262 is brought into contact with the lower end portion of the second extension portion 122. Consequently, the second pad 262 elastically supports the first fastening unit 100.

The holding unit 300 is installed in the first fastening unit 100 in a movable manner. The holding unit 300 is fastened to or separated from the second fastening unit 200 according to the direction of the movement thereof and restricts or allows relative movement of the first fastening unit 100 and the second fastening unit 200. The holding unit 300 according to the embodiment of the present disclosure is formed in such a manner as to have the shape of a sphere and is installed inside the accommodation portion 130. A plurality of the holding units 300 are installed inside a plurality of accommodation portions 130, respectively.

The moving unit 400 described below ascends or descends. Thus, the holding unit 300 moves from inside the accommodation portion 130 to the first position or the second position, and a state where the holding unit 300 is fastened to the second fastening unit 200 is changed.

Figure 7:
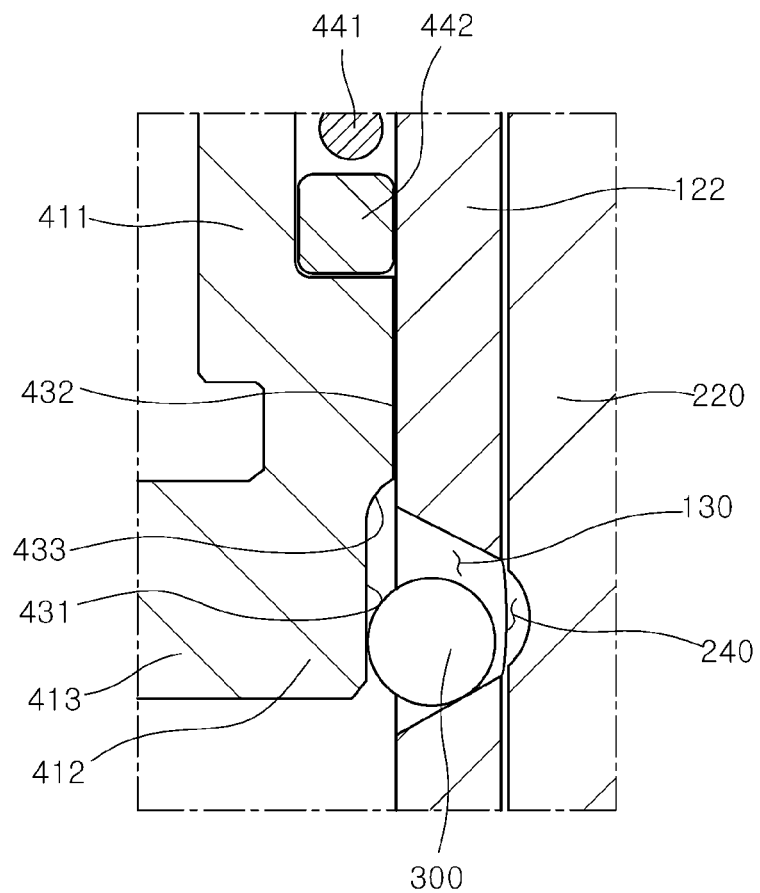
FIG. 7 is a view illustrating a state where a holding unit according to the embodiment of the present disclosure is positioned at a first position.
Figure 8:
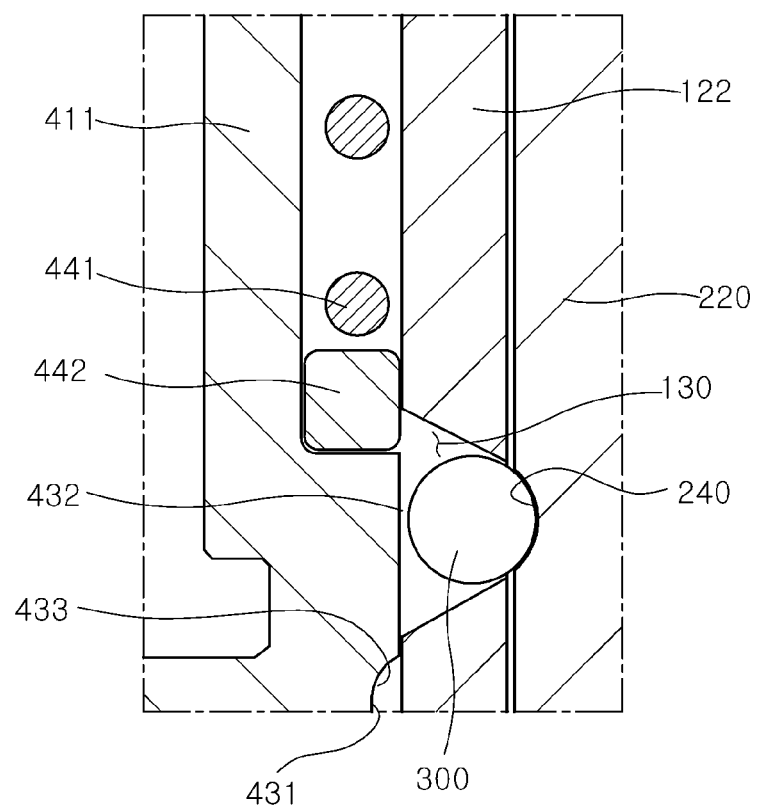
FIG. 8 is a view illustrating a state where a holding unit according to the embodiment of the present disclosure is positioned at a second position.

FIG. 7 is a view illustrating a state where the holding unit 300 according to the embodiment of the present disclosure is positioned at the first position. FIG. 8 is a view illustrating a state where the holding unit 300 according to the embodiment of the present disclosure is positioned at the second position.

With reference to FIG. 7, a state where the holding unit 300 is positioned at the first position may be exemplified by a state where a circumferential surface of the holding unit 300 is separated from an internal surface of the accommodation portion 130 and from the hook 240 and thus does not protrude into a space inside the second extension portion 122.

With reference to FIG. 8, a state where the holding unit 300 is positioned at the second position may be exemplified by a state where the circumferential surface of the holding unit 300 is bought into contact with the internal surface of the accommodation portion 130, where a portion of the circumferential surface thereof thus protrudes into the space inside the second extension portion 122, and where the holding unit 300 is accordingly combined with the hook 240 in a manner that is hooked thereon.

The moving unit 400 is installed outside the first fastening unit in a manner that is enabled to ascend and descend and ascends or descends by a magnetic force and thus adjusts the direction of movement of the holding unit 300.

The moving unit 400 according to the embodiment of the present disclosure includes a moving body 410, a drive unit 420, a guide unit 430, and a restoration unit 440.

The moving body 410 is arranged to face an external surface of the first fastening unit 100 and is installed in a manner that is enabled to ascend and descend along a lengthwise direction of the first fastening unit 100.

Figure 9A:
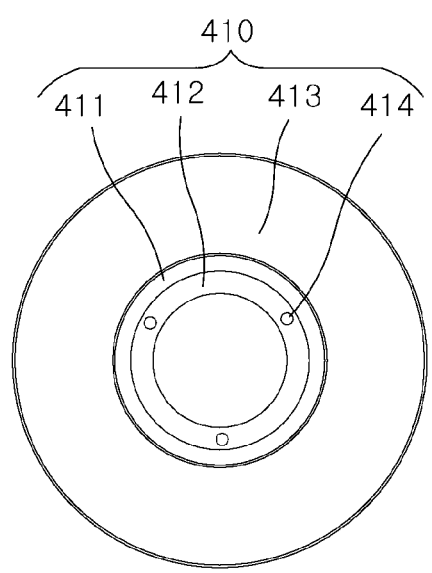
FIGS. 9A and 9B are a perspective view schematically illustrating a configuration of a moving body according to the embodiment of the present disclosure.
Figure 9B:
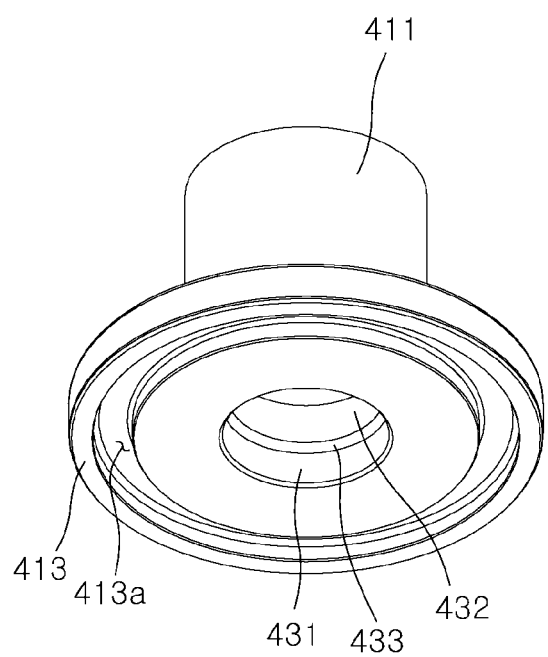

FIG. 9 is a perspective view schematically illustrating a configuration of the moving body 410 according to the embodiment of the present disclosure.

With reference to FIG. 9, the moving body 410 according to the embodiment of the present disclosure includes a first moving body 411, a second moving body 412, a mounting portion 413, and a second extending groove 414.

The first moving body 411 is formed in such a manner as to have the shape of a hollow cylinder and is installed between the flange 110 and the bracket 210. The first moving body 411 is arranged in such a manner that an inner circumferential surface thereof faces an outer circumferential surface of the extension portion 120. The first moving body 411 is formed in such a manner that the inner circumferential surface thereof has a greater diameter than the outer circumferential surface of the second extension portion 122. Accordingly, the first moving body 411 may have a space between the inner circumferential surface thereof and the outer circumferential surface of the second extension portion 122. The restoration unit 440 described below is installed in the space.

The second moving body 412 vertically extends downward from a lower end portion of the first moving body 411. The second moving body 412 is formed in such a manner that an inner circumferential surface thereof has a smaller diameter than an inner circumferential surface of the first moving body 411 and has a greater diameter than the outer circumferential surface of the second extension portion 122.

The mounting portion 413 is formed in the shape of a circular plate in such a manner as to horizontally extends in a radial direction of the second moving body 412 from the outer circumferential surface of the second moving body 412. The mounting groove 413a is formed in the mounting portion 413 by concavely recessing a lower surface of the mounting portion 413 toward an upper surface of the mounting portion 413. The mounting groove 413a extends along a circumferential direction of the mounting portion 413 in such a manner as to form a closed curve.

The second extending groove 414 is formed in the second moving body 412 in a manner that passes therethrough. The second extending groove 414 according to the embodiment of the present disclosure may be formed in the shape of a hole in such a manner as to vertically pass through an upper surface of the second moving body 412. A plurality of the second extending grooves 414 may be arranged to be spaced a predetermined distance apart along a circumferential direction of the second moving body 412.

The drive unit 420 generates a magnetic field and thus moves the moving body 410 to one side. An example where the moving body 410 is moved upward by the magnetic field occurring from the drive unit 420 will be described below. However, the movement of the moving body 410 is not limited to the upward direction. It is also possible that the moving body 410 is moved downward by the magnetic field occurring from the drive unit 420.

The drive unit 420 according to the embodiment of the present disclosure includes the electromagnet 421 and a permanent magnet 422.

The electromagnet 421 is fixed to the second fastening unit 200. Application of electric current to the electromagnet 421 generates a magnetic field. The electromagnet 421 according to the embodiment of the present disclosure is exemplified by various types of electromagnets of which magnetic fields are generated by supply of electric current. The electromagnet 421 is formed in such a manner as to have the shape of a hollow ring and is arranged between the second pad 262 and the seating portion 260. By an elastic restoring force of the second pad 262 itself, an inner circumferential surface and an outer circumferential surface of the electromagnet 421 are brought into close contact with an outer circumferential surface of the second pad 262 and an inner circumferential surface of the seating portion 260, respectively, for being fixed thereto. The electromagnet 421 is electrically connected to a wire installed inside the wire groove 261 and is supplied with electric current.

The permanent magnet 422 is fixed to the moving body 410 and is arranged to face the electromagnet 421. The permanent magnet 422 according to the embodiment of the present disclosure is configured to maintain a magnetized state and to continuously apply a magnetic field to an adjacent area and may be exemplified by any one of alnico magnet, a ferrite magnet, a neodymium magnet and a samarium cobalt magnet. The permanent magnet 422 is formed in such a manner as to have the shape of a hollow ring. The permanent magnet 422 is inserted into the mounting groove 413a for being fixed thereto by concavely recessing the lower surface of the mounting portion 413. The permanent magnet 422 is installed in such a manner as to have a polarity in the direction opposite to a magnetic field occurring from the electromagnet 421 so that when the electromagnet 421 operates, the moving body 410 can be moved upward by a repulsive force of the electromagnet 421.

The guide unit 430 is provided between the moving body 410 and the first fastening unit 100 and guides the movement of the holding unit 300 in conjunction with the upward and downward movements of the moving body 410. That is, according to the direction in which the moving body 410 ascends and descends, the guide unit 430 guides the holding unit 300 in switching from the first position to the second position or the second position to the first position.

Figure 10:
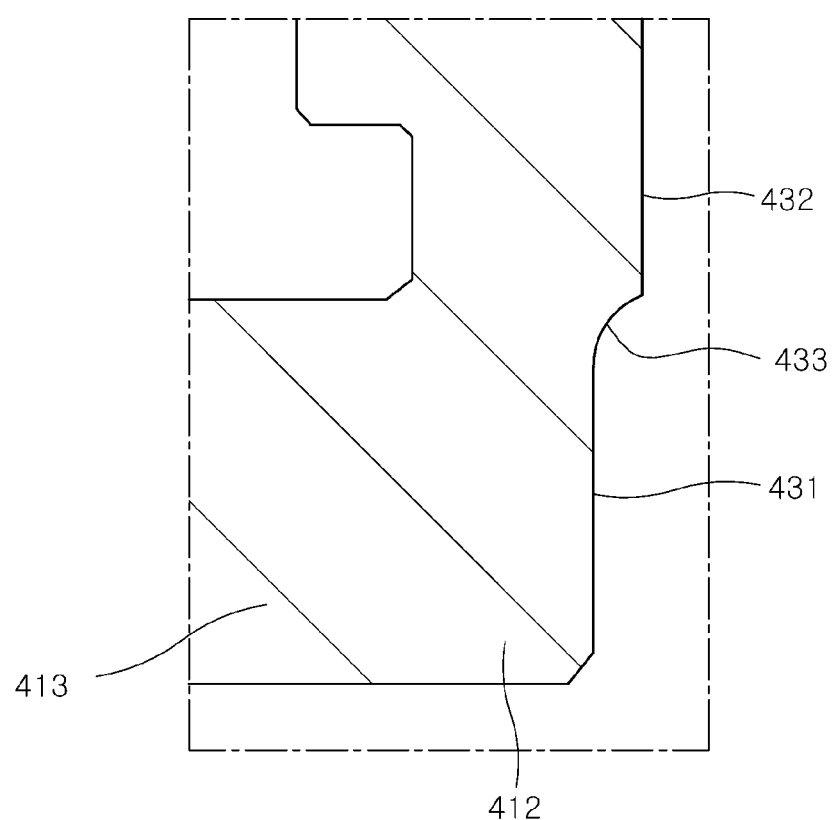
FIG. 10 is an enlarged view schematically illustrating a configuration of a guide unit according to the embodiment of the present disclosure.

FIG. 10 is an enlarged view schematically illustrating a configuration of the guide unit 430 according to the embodiment of the present disclosure.

The guide unit 430 according to the embodiment of the present disclosure includes a first guide groove 431, a second guide groove 432, and a third guide groove 433.

The first guide groove 431 is formed by concavely recessing an internal surface of the moving body 410 and keeps the holding unit 300 positioned at the first position. The first guide groove 431 according to an embodiment of the present disclosure may be formed in the shape of a groove by concavely recessing an internal surface of a lower end portion of the second moving body 412 in the radial direction of the second moving body 412 toward the outside. In a case where the electromagnet 421 generates a magnetic field and thus the moving body 410 is fully moved upward, the first guide groove 431 is arranged to face the accommodation portion 130. The first guide groove 431 is arranged in such a manner that an internal surface thereof is spaced a predetermined distance away from an external surface of the second extension portion 122 or an external end portion of the accommodation portion 130. It is possible that the distance the first guide groove 431 is spaced away from the second extension portion 122 or the accommodation portion 130 is variously design-changed within a predetermined range of distances where, in a case where the holding unit 300 is arranged at the first position and where a circumference of one side of the holding unit 300 is brought into contact with an internal surface of the first guide groove 431, a circumference of the other side of the holding unit 300 does not protrude into the second extension portion 122.

The second guide groove 432 protrudes from the internal surface of the moving body 410 and keeps the holding unit 300 positioned at the second position. The second guide groove 432 according to the embodiment of the present disclosure horizontally protrudes from an internal surface of an upper end portion of the second moving body 412 in the radial direction of the second moving body 412 toward the inside. In a case where the magnetic field of the electromagnet 421 is no longer generated and where the moving body 410 is fully moved downward, the second guide groove 432 is arranged to face the accommodation portion 130. The second guide groove 432 may be formed in such a manner that a diameter of an inner circumferential surface thereof corresponds to a diameter of the outer circumferential surface of the second extension portion 122. Accordingly, the second guide groove 432 may keep the holding unit 300 fastened to the second fastening unit 200 without deviating from the second position.

The third guide groove 433 is provided between the first guide groove 431 and the second guide groove 432 and guides the holding unit 300 in being moved from the first position to the second position or from the second position to the first position. The third guide groove 433 according to the embodiment of the present disclosure may be formed in such a manner that both end portions thereof have a curved surface and are connected to an upper end portion of the first guide groove 431 and a lower end portion of the second guide groove 432, respectively. The third guide groove 433 is provided in a manner that is rounded with a predetermined curvature. In this case, the third guide groove 433 may be formed in such a manner that a curvature thereof corresponds to a curvature of the holding unit 300. Accordingly, the third guide groove 433 may prevent a phenomenon where the holding unit 300 is stuck due to a difference in diameter between the first guide groove 431 and the second guide groove 432.

When the magnetic field occurring from the drive unit 420 is no longer generated, the restoration unit 440 moves the moving body 410 to the other side. That is, when the magnetic field of the electromagnet 421 is no longer generated, the restoration unit 440 moves downward the upward moved moving body 410. Accordingly, the restoration unit 440 may cause the first fastening unit 100 and the second fastening unit 200 to repeatedly perform a fastening operation without any separate operation.

The restoration unit 440 according to the embodiment of the present disclosure includes an elastic member 441 and a support portion 442.

The elastic member 441 is installed between the moving body 410 and the first fastening unit 100 and elastically supports the moving body 410 with respect to the first fastening unit 100. The elastic member 441 according to the embodiment of the present disclosure may be formed in the shape of a coil spring in a manner that is expandable or contractable along a lengthwise direction thereof. The elastic member 441 is arranged in such a manner that a lengthwise direction thereof is in parallel with the lengthwise direction of the first fastening unit 100. The second extension portion 122 and the first moving body 411 are spaced a distance apart, and thus the elastic member 441 is arranged in a space formed between the outer circumferential surface of the second extension portion 122 and the inner circumferential surface of the first moving body 411. The elastic member 441 is arranged in such a manner that both end portions thereof face the upper surface of the second moving body 412 and the lower surface of the first extension portion 121, respectively.

The support portions 442 in one pair are fixed to the moving body 410 and the first fastening unit 100, respectively. The support portions 442 in one pair support both sides of the elastic member 441 with respect to the moving body 410 and the first fastening unit 100, respectively. The support portions 442 in one pair according to the embodiment of the present disclosure are formed in such a manner as to have the shape of a circular ring and are arranged to be spaced a distance apart along the lengthwise direction of the first fastening unit 100. Internal surfaces of the support portions 442 in one pair are end portions, respectively, of the elastic member 441, and thus the support portions 442 are brought into close contact with end portions, respectively, of the elastic member 441 for being fixed thereto. A plurality of the stationary protrusions (not illustrated) are formed in an external surface of each of the support portions 442 in one pair in such a manner as to protrude therefrom. The stationary protrusion formed on the external surface of any one support portion 442 of the support portions 442 in one pair is forced to fit into the first extending groove 140 for being combined therewith, and thus the support portion 442 is fixed to the lower surface of the first extension portion 121. The stationary protrusion formed on the external surface of the other support portion 442 of the support portions 442 in one pair is forced to fit into the second extending groove 414 for being combined therewith, and thus the support portion 442 is fixed to an upper surface of the second moving body 412.

A process of assembling the fastening apparatus 1 for a vehicle according to the embodiment of the disclosure will be described in detail below.

Figure 11:
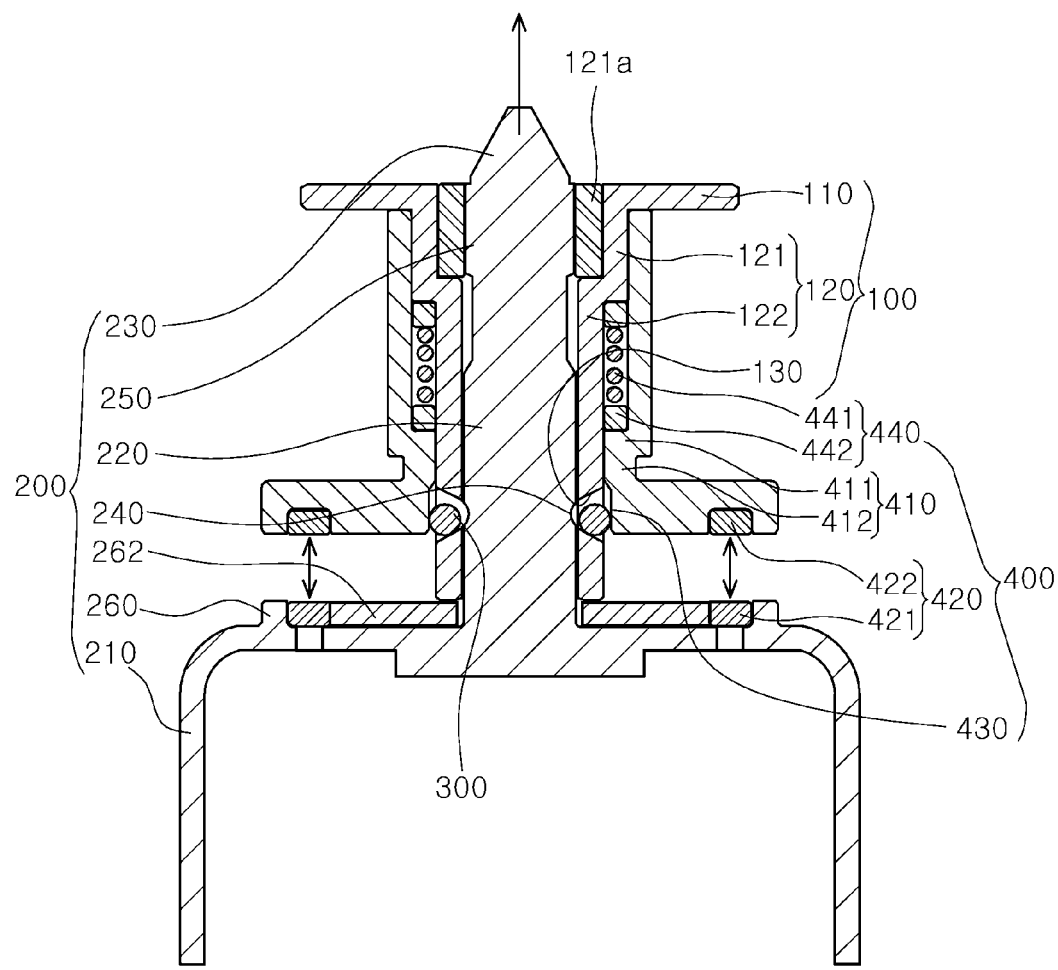
FIGS. 11 and 12 are views each schematically illustrating a process of assembling the fastening apparatus for a vehicle according to the embodiment of the present disclosure.
Figure 12:
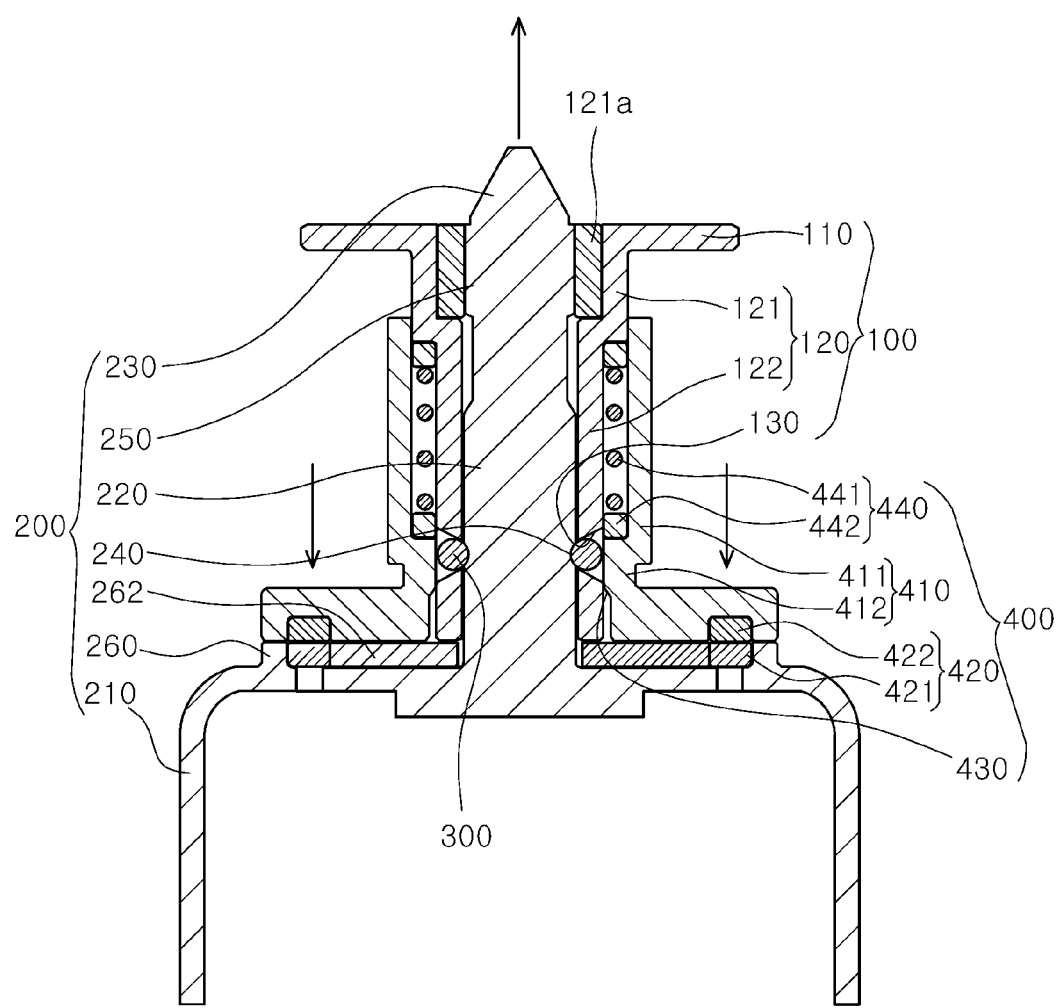

FIGS. 11 and 12 are views each schematically illustrating the process of assembling the fastening apparatus for a vehicle according to the embodiment of the present disclosure.

With reference to FIGS. 11 and 12, the first structure 10 is seated on the top of the second structure 20, and thus the second fastening unit 200 fixed to the second structure 20 is inserted into the first fastening unit 100.

The moving body 410 is installed in a state where the moving body 410 initially descends, and accordingly, the holding unit 300 is kept arranged at the second position.

Subsequently, electric current is applied to the electromagnet 421, and thus the electromagnet 421 generates a magnetic field.

The moving body 410 is moved upward by a repulsive force acting between the electromagnet 421 and the permanent magnet 422.

The moving body 410 is fully moved upward, and thus the first guide groove 431 is arranged to face the accommodation portion 130.

Along the internal surface of the accommodation portion 130, the holding unit 300 that is no longer in contact with the second guide groove 432 is moved, by its own weight, in the radial direction of the extension portion 120 toward the outside. The holding unit 300 switches from the second position to the first position.

A circumferential surface of the holding unit 300 is brought into contact with the internal surface of the first guide groove 431, and thus the holding unit 300 is prevented from being separated from the accommodation portion 130.

The holding unit 300 is moved to the first position and opens a path along which the second fastening unit 200 is inserted into the first fastening unit 100. The insertion portion 220 proceeds to be inserted into the extension portion 120.

The insertion portion 220 is inserted up to a point where the lower end portion of the second extension portion 122 comes into contact with an upper end portion of the second pad 262.

Subsequently, supply of electric current to the electromagnet 421 is interrupted, and thus the repulsive force applied between the electromagnet 421 and the permanent magnet 422 is no longer applied.

The moving body 410 is moved downward by its own weight and an elastic restoring force of the elastic member 441.

The moving body 410 is moved downward up to a point where the lower surface of the mounting portion 413 is brought into contact with the second pad 262.

The second guide groove 432 is arranged to face the accommodation portion 130 in conjunction with the downward movement of the moving body 410.

The holding unit 300 brought into contact with internal surface of the first guide groove 431 is moved by the third guide groove 433 in the radial direction of the extension portion 120 toward the inside. In this case, the third guide groove 433 is provided in a manner that is rounded with a predetermined curvature, and thus the holding unit 300 may be smoothly moved in the radial direction of the extension portion 120 toward the inside without undergoing particular interference.

That is, the holding unit 300 switches from the first position to the second position, and one portion of the circumferential surface thereof protrudes into a space inside the extension portion 120.

The holding unit 300 protruding into the space inside the extension portion 120 is fastened to the hook 240 and thus restricts relative movement of each of the first fastening unit 100 and the second fastening unit 200.

The holding unit 300 is brought into contact with an internal surface of the second guide groove 432 and is kept fastened to the hook 240.

The first fastening unit 100 and the second fastening unit 200 may be separated from each other in the reverse order to the order in which the first fastening unit 100 and the second fastening unit 200 that are described above are assembled.

Various embodiments disclosed above are directed to a fastening apparatus for a vehicle, the apparatus being capable of easily mounting or separating a top hat or a battery module on and from a chassis frame of a purpose-built vehicle (PBV).

In the fastening apparatus for a vehicle according to the present disclosure, components necessary to fasten the first structure and the second structure to each other are realized as one assembly. Thus, a machine and manpower can be prevented from being wasted in an additional feeding operation during assembling, and the components can be prevented from being lost.

In addition, in the fastening apparatus for a vehicle according to the present disclosure, the moving unit adjusting the direction of the movement of the holding unit is installed in a manner that is enabled to ascend and descend by a magnetic force. Thus, a process of fastening the first fastening unit and the second fastening unit can be performed without a separate tool.

In addition, in the fastening apparatus for a vehicle according to the present disclosure, the first fastening unit and the second fastening unit can be repeatedly fastened to and separated from each other by the restoration unit. Thus, the efficiency and consistency of assembling can be improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A fastening apparatus for a vehicle, comprising:
   a first fastening unit fixed to a first structure;
   a second fastening unit fixed to a second structure, the second fastening unit being inserted into the first fastening unit;
   a holding unit movably installed on the first fastening unit and being configured to restrict and allow relative movement of each of the first fastening unit and the second fastening unit according to a direction of movement of the holding unit; and
   a moving unit installed outside the first fastening unit, the moving unit being configured to ascend and descend by a magnetic force, and to adjust the direction of the movement of the holding unit.

2. The fastening apparatus of claim 1, wherein the first fastening unit comprises:
   an extension portion extending toward the second fastening unit; and
   an accommodation portion formed in the extension portion to pass therethrough, and being configured to movably support the holding unit in a radial direction of the extension portion.

3. The fastening apparatus of claim 2, wherein a width of the accommodation portion decreases toward an inside of the extension portion.

4. The fastening apparatus of claim 2, wherein a plurality of the accommodation portions are provided and are arranged to be spaced a distance apart along a circumference of the extension portion.

5. The fastening apparatus of claim 2, wherein the second fastening unit comprises:
   an insertion portion inserted into the first fastening unit; and a hook formed by concavely recessing an external surface of the insertion portion and being fastened to the holding unit.

6. The fastening apparatus of claim 5, wherein the insertion portion is fully inserted into the first fastening unit to connect the hook with the accommodation portion.

7. The fastening apparatus of claim 5, wherein the second fastening unit further comprises:
   a rotation prevention portion protruding from the insertion portion to prevent relative rotation of the first fastening unit and the second fastening unit.

8. The fastening apparatus of claim 7, wherein an elastically-transformable first pad is installed on an inner circumferential surface of the extension portion, and
   the rotation prevention portion is configured to press against the first pad to be in close contact with the first pad.

9. The fastening apparatus of claim 2, wherein the holding unit is spherical in shape and installed inside the accommodation portion.

10. The fastening apparatus of claim 1, wherein the moving unit comprises:
    a moving body arranged to face the first fastening unit and being configured to ascend and descend along a lengthwise direction of the first fastening unit;
    a drive unit generating a magnetic field to move the moving body to one side; and
    a guide unit provided between the moving body and the first fastening unit and being configured to guide movement of the holding unit in conjunction with upward and downward movements of the moving body.

11. The fastening apparatus of claim 10, wherein the drive unit comprises:
    an electromagnet fixed to the second fastening unit and being configured to generate a magnetic field by application of electric current thereto; and
    a permanent magnet fixed to the moving body and arranged to face the electromagnet.

12. The fastening apparatus of claim 10, wherein the guide unit comprises:
    a first guide groove formed by concavely recessing an internal surface of the moving body and being configured to keep the holding unit positioned at a first position;
    a second guide groove protruding from the internal surface of the moving body and being configured to keep the holding unit positioned at a second position; and
    a third guide groove provided between the first guide groove and the second guide groove and being configured to guide the holding unit in being moved from the first position to the second position.

13. The fastening apparatus of claim 12, wherein the third guide groove is rounded with a predetermined curvature.

14. The fastening apparatus of claim 10, wherein the moving unit further comprises:
    a restoration unit configured to move the moving body to the other side, in response to the magnetic field no longer occurring from the drive unit.

15. The fastening apparatus of claim 14, wherein the restoration unit comprises:
    an elastic member installed between the moving body and the first fastening unit to be expandable and contractable along a lengthwise direction thereof; and
    a pair of support portions fixed to the moving body and the first fastening unit, respectively, and being configured to supporting both sides, respectively, of the elastic member.

* * * * *